June 22, 1937.　　　S. L. C. COLEMAN　　　2,084,320
VEHICLE SUSPENSION
Filed Sept. 25, 1934　　　7 Sheets-Sheet 2
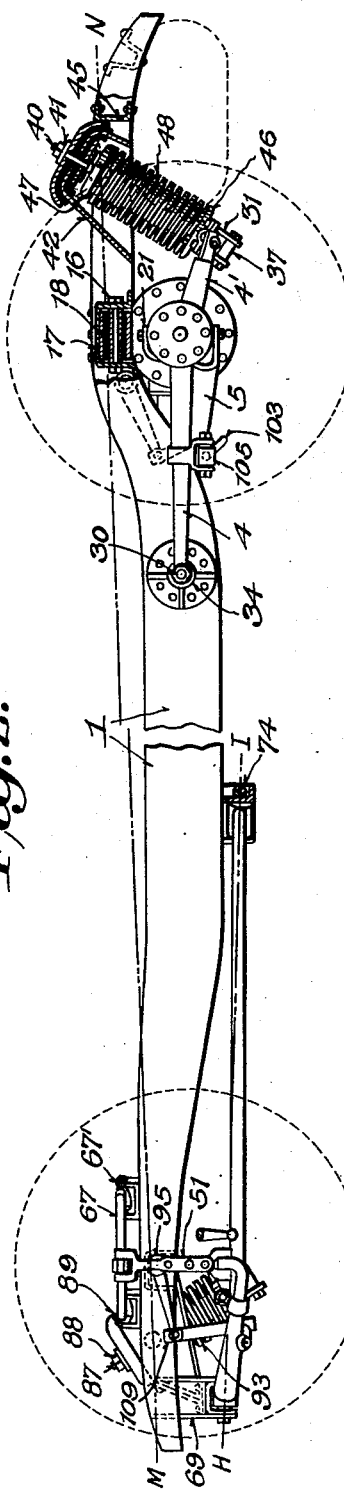
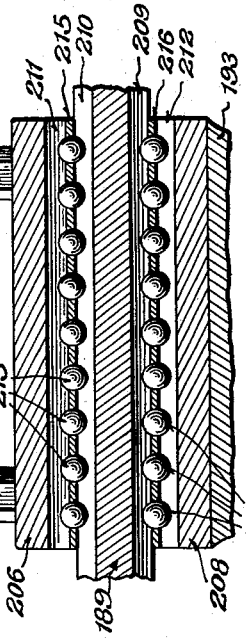
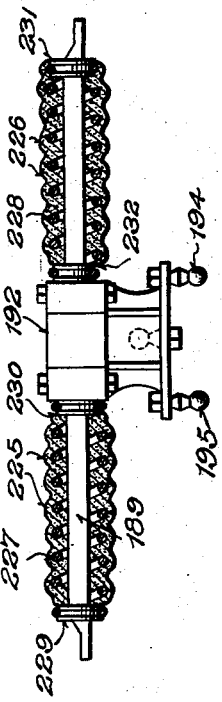
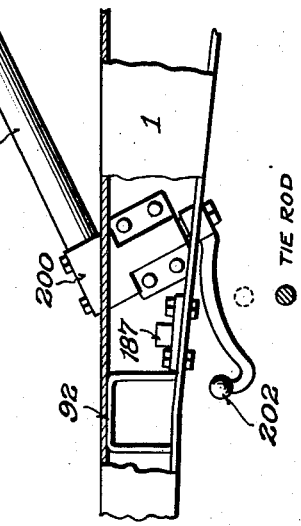
Inventor
Stephen L. C. Coleman,
By R. Clyde Smith,
Attorney June 22, 1937.  S. L. C. COLEMAN  2,084,320
VEHICLE SUSPENSION
Filed Sept. 25, 1934   7 Sheets-Sheet 3

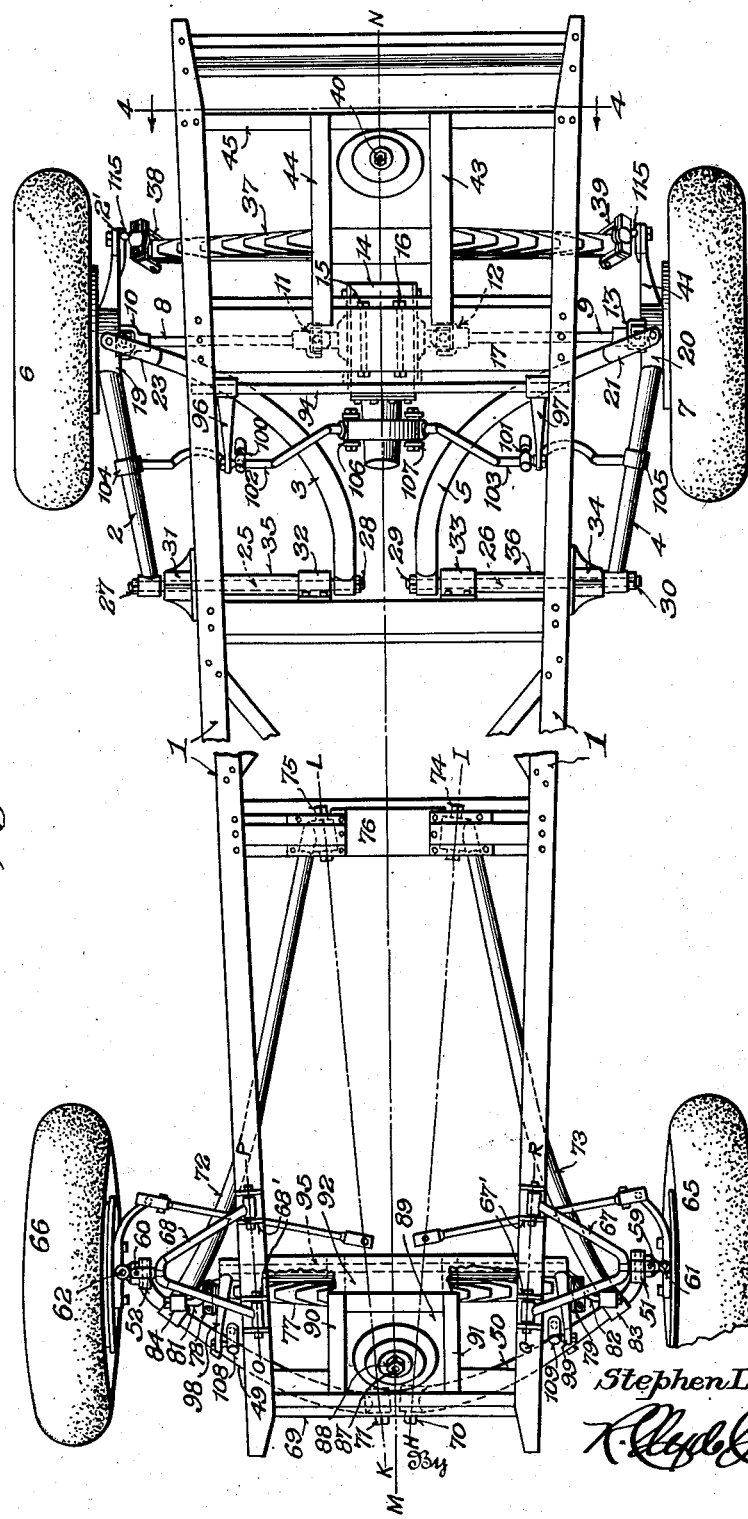

Inventor
Stephen L. C. Coleman,
By [signature]
Attorney

June 22, 1937.　　　　S. L. C. COLEMAN　　　　2,084,320
VEHICLE SUSPENSION
Filed Sept. 25, 1934　　　7 Sheets-Sheet 5

Inventor
Stephen L. C. Coleman,
By
Attorney

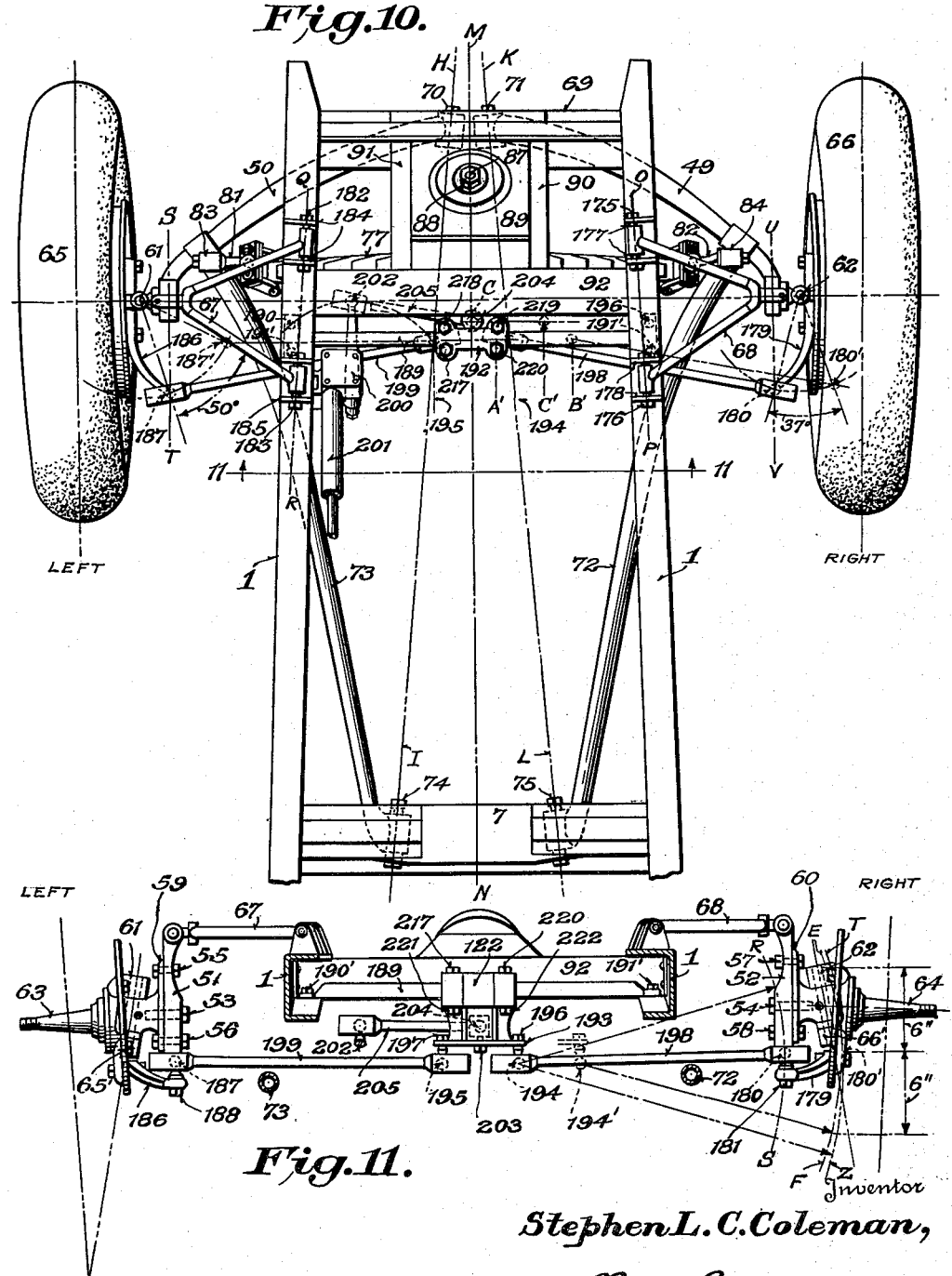

June 22, 1937. S. L. C. COLEMAN 2,084,320
VEHICLE SUSPENSION
Filed Sept. 25, 1934 7 Sheets-Sheet 7

Stephen L. C. Coleman,

Patented June 22, 1937

2,084,320

UNITED STATES PATENT OFFICE 2,084,320

VEHICLE SUSPENSION

Stephen Leonard Chauncey Coleman, Fredericton, New Brunswick, Canada

Application September 25, 1934, Serial No. 745,463

18 Claims. (Cl. 280—124)

This invention relates to spring suspensions of the same general broad principles as set forth in applicant's Reissue Patent No. 18,177 dated Sept. 8, 1931 and copending application Ser. No. 691,231 filed Sept. 27, 1933; but in the instant invention various improvements are set forth and the design is better calculated to secure the utmost advantages from the principles involved.

The broad object of the invention is to combine a spring suspension of the type herein described, with independently sprung wheels, arranged in such a manner that the tread width between the wheels on the ground measured at right angles to the vehicle frame will always remain constant.

A further object is to greatly increase the flexibility under one wheel action, at both the front and rear end of the car, while at the same time the stability against rolling is very greatly increased, and movements due to centrifugal force when rounding curves are eliminated by having the longitudinal rolling axis pass through the center of gravity of the sprung weight of the vehicle.

Another object is to ensure approximately equal vertical thrusts of little force, against the side rails of the frame under one wheel rise at both the front and rear axles, so that the body of the vehicle will not follow either the front or rear wheels under lateral tilts of the road, but will tend to remain level.

A further object is to equalize the load on the wheels on each side of a car at all times, and thus improve the traction and also eliminate the heavy twisting stresses usually set up in the frame and body of a car when passing over uneven road surfaces.

Another object is to greatly reduce overbounding, afterbounding and pitching and to relieve the laminated leaf springs from torsional strains, and to maintain equal pressure on every side of the coil springs.

Another object is to eliminate high frequency vibration and resonance by the use of suitable insulation at points of contact between the running gear and frame, eliminating metal to metal contact.

Another object is to provide a spring suspension with dual characteristics, giving extreme flexibility on the first part of the spring suspension stroke, with sufficient resistance on the last part of the stroke to prevent frequent bottoming.

A still further object is to provide a spring suspension with springs in series, having widely different degrees of flexibility so that it is impossible to have them both at the same time synchronize with the road undulations, and thereby to provide a more comfortable and safer car to drive.

Generally stated the improved spring suspension comprises front and rear semi-elliptic transverse laminated leaf springs, on top of which at their centers in each instance, is mounted a coil spring, each coil preferably enclosing a pair of telescoping tubes, the lower tube being secured to the leaf spring, while the top tube is surmounted by a ball and socket joint, through which it is attached to the vehicle frame. The coil spring in this combination tends to hold the tubes extended in relation to each other, and supports the weight of the vehicle in series with the leaf spring. The coil and leaf spring are preferably arranged at an angle to the vertical plane in such a way that the angle increases under spring stroke. The front and rear spring suspensions are identical in all respects except as to dimensions and degrees of flexibility.

In combination with these main springs are two spring steel torsion rods arranged transversely of the frame, one near the front end and the other near the rear end of the car. The ends of these torsion rods are mounted in free bearings in the frame and the outer ends of these rods are provided with fixed arms projecting forwardly in the same plane, the ends of said arms being flexibly connected to the running gear in a manner different from conventional practice, which will be fully described later herein.

Each of the ends of the transverse leaf springs is connected to the running gear by means of a shackle having a pivot pin joint at its lower end and a ball and socket joint at its upper end, as is clearly shown in Figs. 1, 2, 3 and 4.

The front end of the running gear used in this instance in combination with the novel spring suspension herein described is a type commonly known as parallel levers, while the rear end, is broadly of the type called swinging arms. Both types provide for independent wheel action, and constant tread width.

Preferably, the hydraulic shock absorbers used in combination with this design will be built into the telescoping guide tubes inside the coil springs at each end of the car and in connection with the front spring suspension a type of steering mechanism commonly called a divided steering linkage will be used.

The preferred embodiment of the invention is illustrated in the accompanying drawings, in which:

Figure 1 is a plan view of the complete assembly;

Figure 2 is a view in elevation and partly in section of Figure 1;

Figure 4:
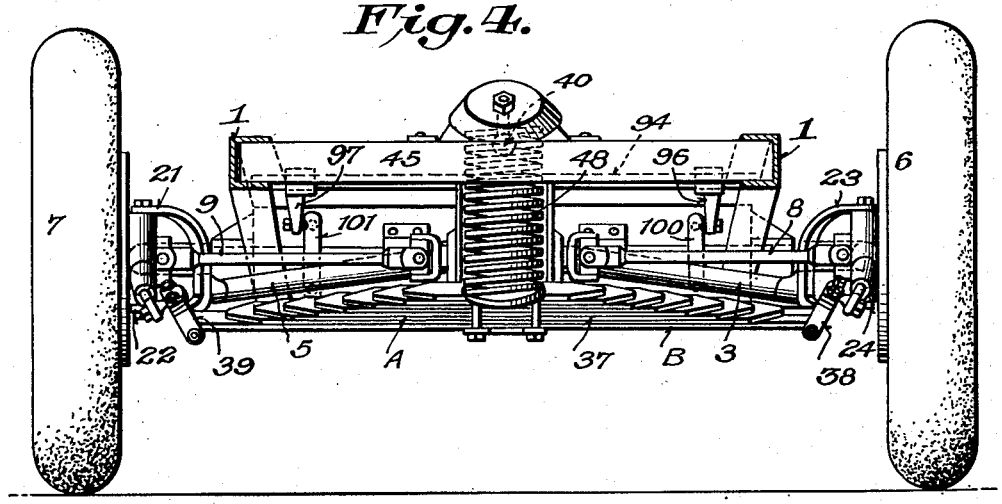
Figure 5:
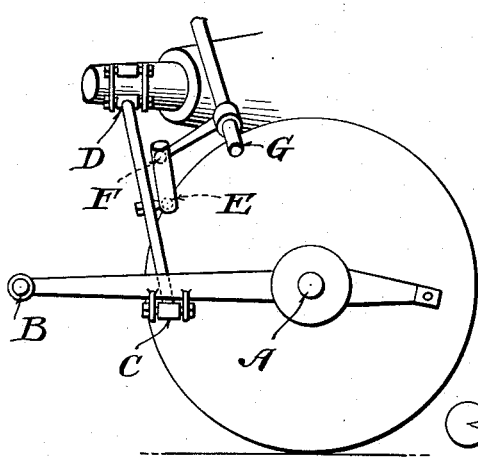
Figure 6:
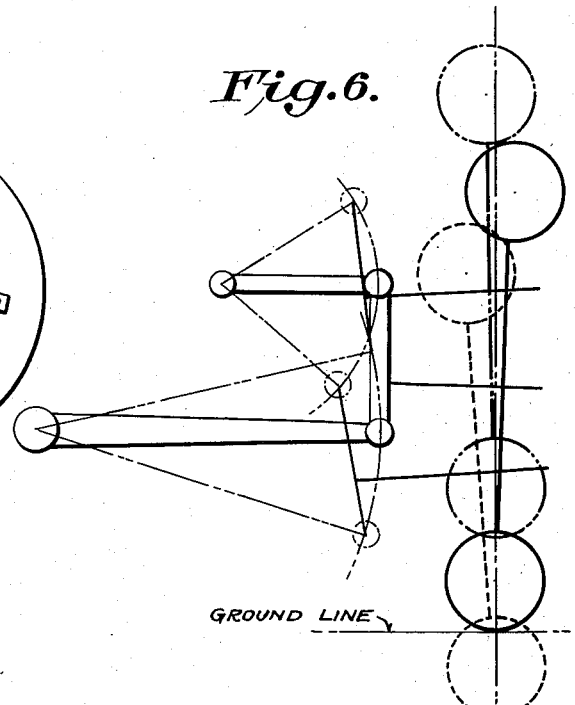
Figure 14:
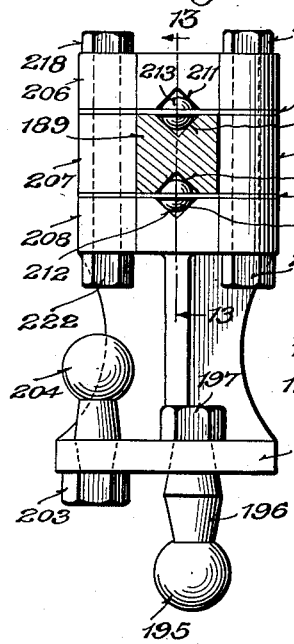
Figure 7:
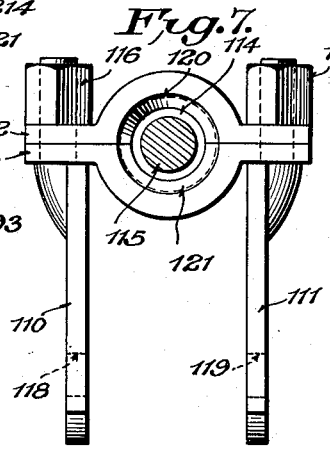
Figure 8:
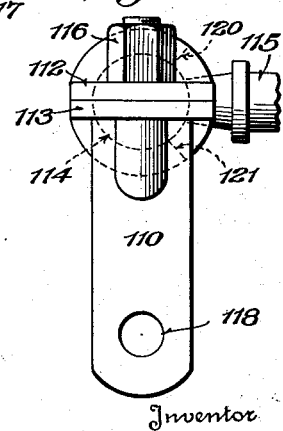
Figure 9:
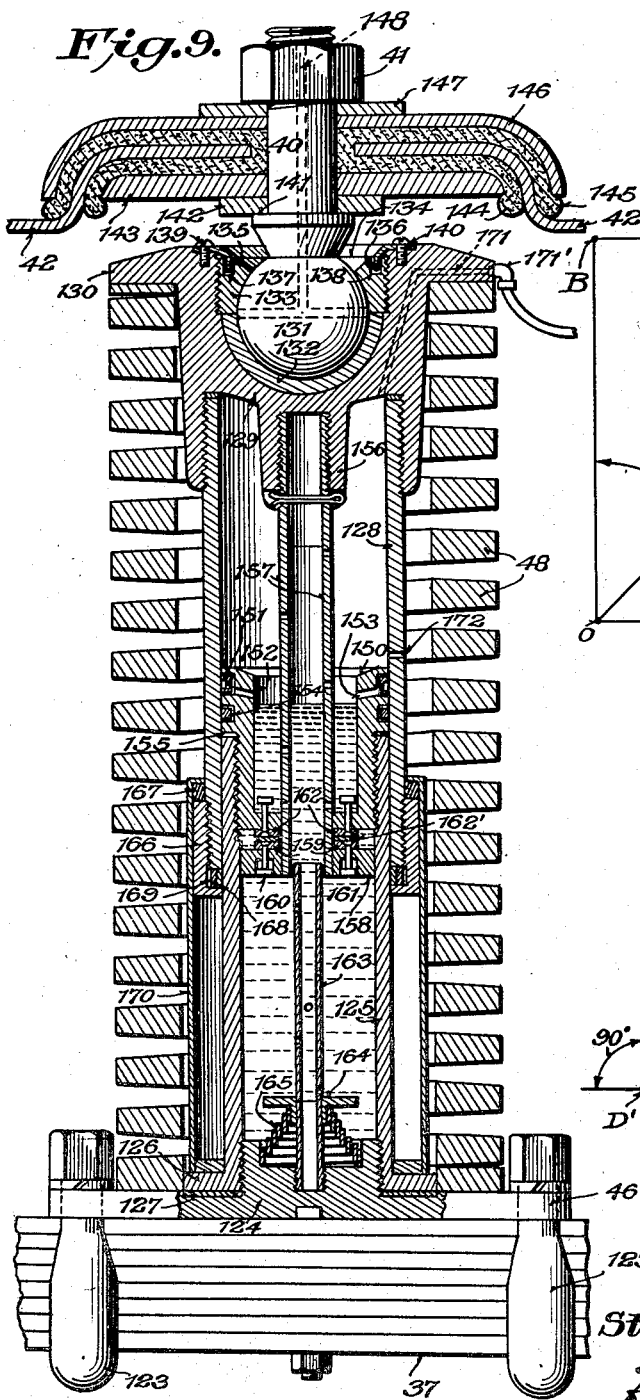
Figure 19:
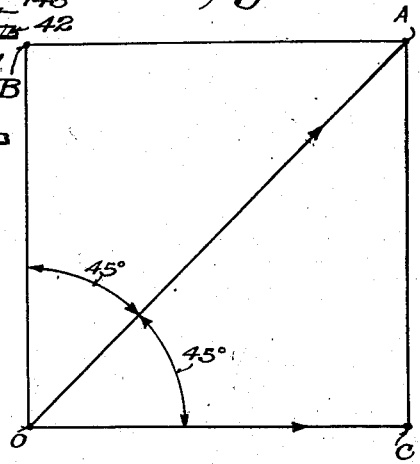
Figure 20:
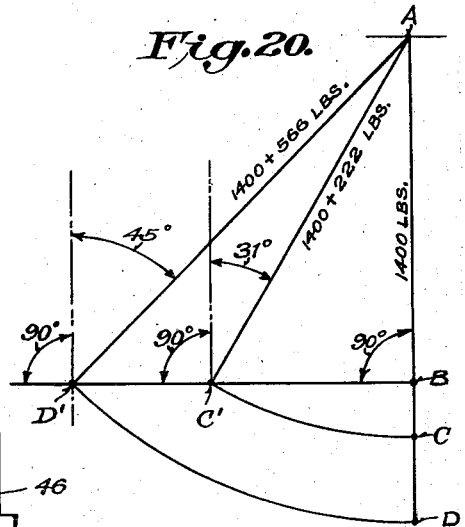
Figure 16:
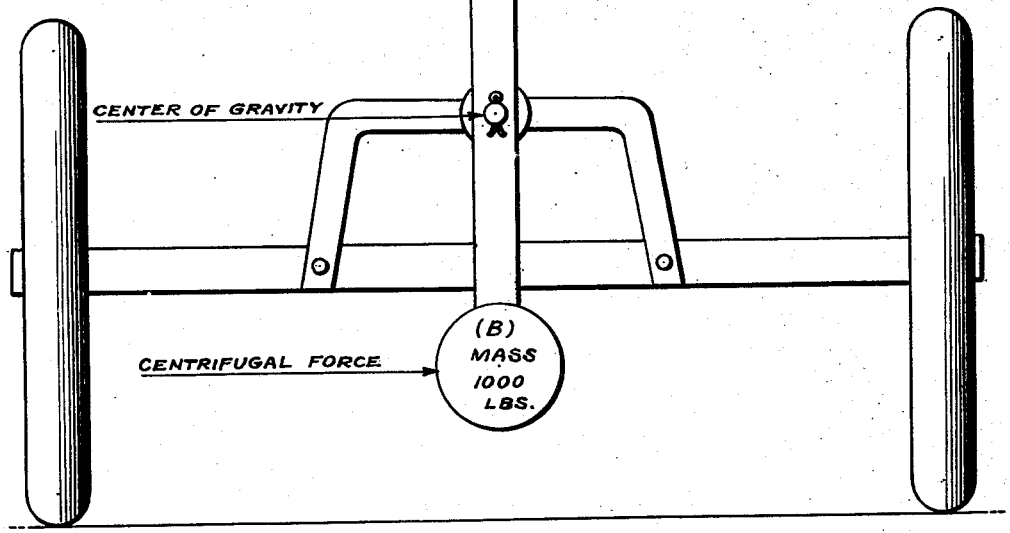

Figure 4 is a rear end elevation of Figure 1, taken on the section line 4—4. This view shows the leaf and coil spring of the suspension, the two pairs of swinging arms which control the location of the rear wheels in relation to the longitudinal axis of the chassis, the torsional stabilizer with its links connected to the running gear and the two live axles with their universal joints through which the wheels are driven;

Figure 5 is a diagram illustrating the novel method used to connect the torsional stabilizer with the running gear, at the rear end of the car;

Figure 6 is a diagram showing how constant tread width is maintained by the use of parallel levers arranged with a short one above and a long one below;

Figures 7 and 8 are enlarged detail views of the ball and socket shackle construction used on the outer ends of the transverse leaf springs;

Figure 9 is an enlarged detail view, in elevation and section, of the combined telescoping tubes and built in hydraulic shock absorber and cooperating coil spring;

Figure 10 is a partial plan view of the chassis, showing the front end thereof illustrating the steering gear and linkage as applied thereto;

Figure 11 is a view from the rear in elevation of the front end taken on the sectional line 11—11 of Figure 10, many of the parts being omitted to show the steering linkage more clearly;

Figure 12 is a side elevation showing the steering gear box, steering column and pitman arm and their relation in the vertical plane to other parts shown;

Figure 13 is a sectional detail view in elevation taken on the line 13—13 of Figure 14, showing the ball bearing arrangement in the steering linkage carriage;

Figure 14 is an end detail view in elevation, of the carriage for the steering linkage, which carries the three ball joints connected by drag links one to each wheel and one to the pitman arm, as illustrated in Figures 10 and 11;

Figure 15 is a detail view in side elevation of the steering linkage carriage with the square rod on which it travels and the fabric cover to exclude dirt and retain lubricant;

Figures 16, 17, 18, 19 and 20 are diagrammatic views illustrating the practical and theoretical operation of the present spring suspension construction.

Referring to the drawings in detail the present invention comprises a chassis frame consisting of side rails 1—1 and a special arrangement of cross members to be more specifically referred to later. Mounted near the rear end of the frame are swinging arms 2, 3, and 4, 5, carrying the road wheels 6, 7 respectively on hollow stub axles, through which pass short live axles, adapted to be rotated by live axles 8, 9. These live axles 8, 9 are each equipped with two universal joints 10, 11, 12 and 13 respectively. Universal joints 11 and 12 connect through a splined joint or its equivalent with the differential inside differential case 14, so that they can slide in and out to take care of the requirement for lengthening and shortening of the live axles 8, 9, when the wheels rise or fall during road travel.

The swinging arms 2 and 4 have enlarged cylindrical sections 19, 20, which are concentric with the wheel centers, to which is attached the brake flange and brake shoes and the hollow stub axles on which the wheels 6 and 7 are mounted on ball or roller bearings not shown. Live axles extend through these hollow stub axles and are connected on their outer ends to the wheels which they rotate. The inner ends of these short live axles are attached to the outer ends of universal joints 10 and 13.

The swinging arms 2 and 4 continue on back of the enlarged cylindrical sections 19 and 20 and provide extensions 2' and 4' respectively, which carry at their rear extremities, ball and socket jointed shackles to be described later herein. The swinging arms 3 and 5 have at their outer ends forked extensions 21, 22 and 23, 24 respectively which straddle the cylinders 19 and 20 and are bolted thereto. The forward ends of arms 2 and 3 and the forward ends of arms 5 and 6 are fastened to transverse shaft 25 and 26 respectively by nuts 27, 28, 29 and 30. These rods 25 and 26 are mounted in bearing housings 31, 32, 33 and 34 carried by the frame. Preferred construction is to use rubber bushings for bearings, the rubber bushing being of a type having an outer and inner steel tube with rubber between them under compression, the bushings are pressed into the housings 31, 32, 33 and 34. This bearing assembly is completed by spacing tubes 35 and 36 placed with their ends in contact with the inner ends of the inner tubes of the rubber bushings. Shaft 25 is then passed through arm 2, the rubber bushing inside bearing housing 31, spacing tube 35, rubber bushing inside bearing housing 32, and through the end of arm 3, and the whole assembly is tightened up by nuts 27 and 28, and will oscillate as a unit on the rubber bushings. The assembly of the bearings and parts for arms 4 and 5 are identical with those just described for arms 2 and 3.

The swinging arms 2 and 4 take the drive of the car, the drive torque and brake torque, while arms 3 and 5 furnish great lateral support for the wheels 6 and 7. The bearings 31, 32 and 33, 34 are quite a distance apart and give a long bearing for shafts 25 and 26 thus reducing the pressure on these bearings and the strains on the arms 2, 3 and 4, 5. The bearing shafts 25 and 26 are level and at right angles to the horizontal plane of the chassis, consequently the wheel rise is absolutely vertical and the tread width constant.

The differential case 14 instead of being carried by the axle is attached by two bolts 15 and 16 to a cross member 17 of the frame, said case being provided with a squared top and having two bores running through it from front to rear, into which are pressed rubber bushings, through which bolts 15 and 16 pass, one of said rubber bushings 18 being shown in section in Figure 2. Through the use of these rubber bushings there is no metal to metal contact between differential case 14 and cross member 17.

Mounted adjacent the rear axles 8, and 9 is a transverse laminated leaf spring 38 having an eye on each end by which it is pivotally connected through bolts to shackles 38 and 39, these shackles 38 and 39 being in turn flexibly connected to arms 2' and 4' respectively by ball and socket joints. The detailed construction of these shackles will be hereinafter more fully described.

Mounted on top of leaf spring 37 and attached thereto intermediate the ends thereof, (Figure 2) is a circular plate 46 with a cylindrical tube projecting upwards therefrom. At the upper portion of this tube and telescoping therewith is another tube provided with a cap 47 having a semi-spherical recess adapted to receive a ball headed stud 40. This stud 40 is provided with a nut 41 whereby the same is rigidly secured to an inverted cup-like member 42 supported between horizontal channel members 43 and 44, (Figure 1). The forward ends of these channel members 43 and 44 are secured to a cross member 17 and the rear ends of said channel members are secured to a cross member 45. A coil spring 48 is mounted concentric with the telescoping tubes and between plate 46 and cap 47, and tends to keep the telescoping tubes extended. This coil is in series with leaf spring 37. A more detailed illustration of this construction is shown in Figure 9, to be hereinafter more fully described. Referring back to the securing of the ball headed stud 40 to the cup-like member 42, it will be noted that there is no metal to metal contact between these parts and the details of this connection will be described later in conjunction with the detailed description of the telescoping connection between the leaf spring and frame and mounting of the coil spring as shown in Figure 9.

Figure 3:
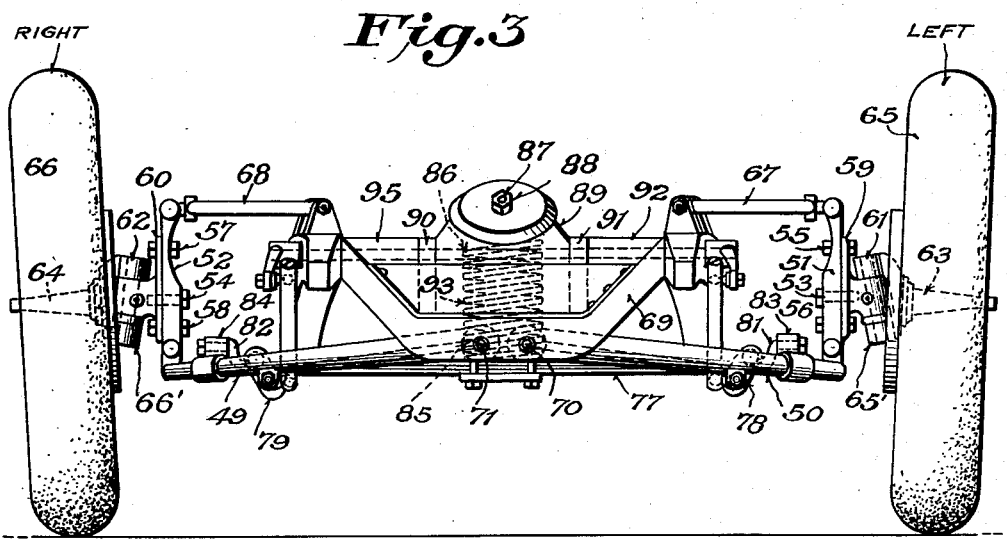
Figure 3 is a front end elevation of Figure 1, showing the arrangement of the parallel levers, the leaf and coil spring and torsional stabilizer bar with its connections.

The foregoing description has been in connection with the spring suspension at the rear end of the car. The construction of the spring suspension and its method of connection to the frame and running gear is substantially the same at the front end of the car, the only difference being in the dimensions of the parts and the arrangement of the front axle tubes and parallel links to provide clearance for the swinging of the wheels in steering and constant track width. These front axle tubes 49 and 50 are pivotally connected at their outer ends to vertical members 51 and 52 respectively (Figures 1, 2 and 3). Secured to said vertical members 51 and 52 by studs 53 and 54 and bolts and nuts 55, 56, 57 and 58 are plates 59 and 60. These plates each have integral therewith a boss projecting toward the wheels adapted to receive the king pins 61 and 62 on which the front wheels swing in steering. Plates 59 and 60 have curved slotted holes for bolts 55, 56, 57 and 58, and by loosening these bolts and the studs 53 and 54 it is possible by a slight axial rotation of the plates 59 and 60, to give the king pins 61 and 62 any desired caster. Stub axles 63 and 64 carry the wheels 65 and 66, these stub axles have on their inner ends forks 65' and 66' respectively by means of which they are pivotally connected to the king pins 61 and 62. The top ends of vertical members 51 and 52 are pivotally connected to V shaped links 67 and 68 respectively, and the inner ends of said links are pivotally connected at 67' and 68' to the side rails 1 and 1 of the frame.

The forward or inner ends of axle tubes 49 and 50 are pivotally connected to the cross member 69 of the frame by bolts 70 and 71. Rigidly connected to these axle tubes 49 and 50 near their rear or outer ends, and projecting rearwardly therefrom are torque tubes 72 and 73, the rear ends of which terminate in cylindrical bearings pivotally connected by bolts 74 and 75 to cross member 76. The pivotal axis of the bearings around bolts 70 and 74 are in line with each other in both the vertical and horizontal planes so that the hinge axis of the pivot bearing at the bottom of the vertical member 51, is along the line H. I. Likewise the pivotal axis of the bearings around bolts 71 and 75 are also in line with each other in both planes, and the hinge axis of the pivot at the bottom of the vertical member 52 is along the line K. L. It is therefore possible to use pin points with rubber bushings at these points, whereas otherwise it would necessitate the use of universal or ball joints. It is necessary, in order to prevent binding, that the axis O. P. (Figure 1) of the bearings 68' on the inner ends of the forked link 68, be parallel with the axis K. L. of tubes 49, 72 and similarly axis Q. R. of the bearings 67' on the inner ends of forked link 67 must be parallel with the axis H. I. of tubes 50, 73, and the axes of the pivotal bearings at the top and bottom of the vertical member 51 must be parallel in both planes with the axes H. I. and Q. R., likewise the axes of the pivotal bearings at the top and bottom of the vertical member 52 must be parallel in both planes with the axes K. L. and O. P. to prevent binding under movement.

The forward or inner end connections 70 and 71 of the axle tubes 49 and 50, the rear end pivotal connections 74 and 75 of the torque arms 72 and 73 and the pivoted connections 67' and 68' of the forked links 67 and 68 are preferably rubber bushed.

Similar to the rear end spring suspension, the front arrangement is provided with a transverse leaf spring 77 having eyes at each end through which it is pivotally connected by bolts to shackles 78 and 79. These shackles are hung on ball headed studs 81 and 82 respectively which are secured in bosses 83 and 84 mounted on top of and near the outer ends of torque tubes 72 and 73 respectively. Mounted on top of leaf spring 77 and attached thereto intermediate the ends thereof (Figs. 2 and 3) is a circular plate 85 with a cylindrical tube projecting upward therefrom. At the upper portion of this tube and telescoping therewith is another tube provided with a cap 86 having a semi-spherical recess adapted to receive a ball headed stud 87; this stud 87 is provided with a threaded portion and a nut 88 whereby the same is rigidly secured to an inverted cup-like member 89 supported between horizontal channel members 90 and 91 (Fig. 1). The forward ends of these channel members 90 and 91 are secured to a cross member 69, and the rear ends are secured to a cross member 92. A coil spring 93 is mounted concentric with the telescoping tubes and between plate 85 and cap 86 which tends to keep the telescoping tubes extended, and this coil spring 93 is in series with leaf spring 77. A more detailed description of this construction is given later herein, with reference to Figure 9.

Co-operating with the complete spring suspensions to secure stability, and adjacent the rear and front axles, transversely of the frame, are two spring steel torsion rods 94 and 95 respectively, having their ends mounted in free bearings in the side frame members 1. The torsion rods 94 and 95 have a pair of arms 96, 97 and 98, 99 respectively near their ends, rigidly secured thereto and projecting therefrom in the same plane. Arms 96 and 97 are flexibly connected by links 100 and 101 with ball and socket joints at each end, to the center portions of transverse levers 102 and 103 respectively, the outer ends of these transverse levers 102 and 103 being pivotally connected at 104 and 105 to swinging arms 2 and 4 half way between the wheel centers and the forward ends of said arms 2 and 4. The inner ends of transverse levers 102 and 103 are connected by swinging shackles 106 and 107 to the forward portion of the differential housing, which is connected to the frame. At the front end of the car, arms 98 and 99 are flexibly connected by links 108 and 109 with ball and socket joints at each end, to axle tubes 49 and 50. It will be noted that the point of attachment of links 108 and 109 to axle tubes 49 and 50 respectively is approximately half way between hinge axis K. L. and wheel 66 and hinge axis H. I. and wheel 65 respectively.

The use of torsion rods of the type described for the purpose of stabilizing a car against rolling is common but in the present case through the method of hooking them up, very little flexibility under one wheel action is sacrificed, as will be explained later herein. In the present case the purpose of the torsion rods 94 and 95 is to take care of out of balance loading, and to resist any rolling impulse about the central longitudinal axis M. N. of the vehicle.

As nearly all the weight of the car is supported on the ball headed studs 40 and 87 at the top of the main spring suspension at each end of the car, the natural rolling axis is along the dotted line M. N. For the sake of stability and to prevent any movements around this axis M. N. due to centrifugal force when rounding curves, it is desirable to have the rolling axis M. N. pass through the center of gravity of the sprung weight of the car.

In Figure 2, it can be clearly seen that the spring assembly both front and rear, is mounted at a considerable angle to the vertical plane, and because the spring assembly is connected to the frame at its top by a ball joint, and at its bottom to the running gear by ball joint shackles at each end of the transverse springs, when wheels 6 and 7 rise and compress the spring assembly the angle of the spring assembly to the vertical plane is greatly increased. In this regard the front end spring assembly is mounted in the same way. The purpose of the angular mounting and its operation will be hereinafter more fully described.

Referring to Figs. 7 and 8, there are shown two detail views in elevation of the shackles 38, 39, 78 and 79, as used in connection with the spring assembly illustrated in Figs. 1, 2, 3 and 4. These shackles comprise side links 110 and 111 having cylindrical projections at their upper ends adapted to receive co-operating plates 112 and 113, said plates so formed as to provide a spherical hollowed space between them at their intermediate portions to accommodate a ball 114 formed on a shank 115, the same being the medium by which said shackle is attached to the arms 2' and 4' and bosses 83 and 84 on torque rods 72 and 73, in the assembly as shown in Figs. 1 and 2.

The plates 112 and 113 are held together by nuts 116 and 117 threaded on the upper cylindrical ends of the parts or links 110 and 111. The ends of the transverse springs 37 and 77 are placed between the side links 110 and 111 of each shackle and pivotally connected therewith by a bolt or the like passing through the holes 118 and 119 near the bottom of said plates 110 and 111. The spherical parts of the plates 112 and 113 are cut away as at 120 and 121 to allow shank 115 which is integral with ball 114, to have ample clearance and permit a considerable free movement of the bottom end of the shackle in any direction.

Both the front and rear spring assembly 77 and 93 and 37 and 48 respectively, have a telescoping connection between the leaf springs and the frame of the car, which also forms a suitable mounting for the coil springs and a housing for the built in shock absorbers as will be noted upon referring to Figure 9 of the drawings.

In Fig. 9 is shown a sectional view in elevation, the center of the telescoping members connecting the leaf spring with the frame, also the coil spring and its mountings and a built in hydraulic shock absorber. The front and rear spring assembly and co-operating parts are identical, but for the purpose of this description the parts in connection with the rear end suspension will be described, the reference character 37 representing the rear transverse spring. Secured to this leaf spring is a circular plate 46 which is firmly secured to leaf spring 37 by U clamps 123 or like means. Plate 46 is provided with a cylindrical boss 124 to which is threaded a steel tube 125, having a flanged base 126 which screws down tight with tube 125 against a seal washer 127.

Telescoping with a close sliding fit around the outside of tube 125 is tube 128, to which is secured by threads a top member or cap 129. This cap has an annular flange 130 which forms a seat for the coil spring 48, and is further provided with a recess in its top center forming a seat for a ball 131 carried by the shank 40. An inserted bearing surface 132 for ball 131 is arranged within the recess and this insert together with the ball 131 are locked in position by a ring 133 shaped to fit the top part of ball 131 and threaded into the cap 129. A locking ring is provided to prevent ring 133 from moving, said locking ring 134 being constructed with projecting lugs 135 and 136 engaging in recesses 137 and 138 in the ring 133, said locking ring 134 being secured to the upper face of cap piece 129 by screws 139 and 140. Shank 40 of ball 131 is provided with a shoulder 141 above which is placed a round washer 142 which in turn carries a circular plate 143, and between this plate 143 and the inverted cap-like member 42 (see Fig. 2) is placed rubber or similar insulation 144, and above the member 42 is placed like insulation 145. This is surmounted by a steel cap saucer like member 146 and above that is a steel washer 147, all of said parts 142, 143, 144, 145, 146 and 147 being held in firm contact with the inverted cup-like member or frame hood 42 by a nut 41 threaded on said shank 40. It will be noted that there is no metal to metal contact between shank 40 and the member 42. The ball headed shank 40 is supplied with an oil duct 148 for lubricating the ball 131. The purpose of the telescoping tubes is to protect the coil spring from any movement except direct compression and extension, and to give in combination with the swinging shackles at the ends of the leaf spring, which are set at an angle for the purpose, a self centering effect to the spring assembly and chassis frame.

In the present instance the interior of the telescoping tubes 125 and 128 contain in effect, a built in hydraulic shock absorber. Tube 125 has a cylindrical member 150 threaded thereon and the outer upper portion of this cylindrical member 150 has a sliding contact with tube 128, said outer upper portion being formed with two annular grooves, the top groove carrying an oil wiping ring 151 similar to those used on the pistons of a gas engine, and as it travels up and down it wipes the surplus oil from the inside wall of tube 128 and returns it to the reservoir in the center of the cylindrical member 150 through ports 152 and 153. The lower annular groove carries an ordinary compression piston ring 154. A circular sealing gasket 155 is provided between the upper end of the tube 125 and the member 150. The bottom part of the member 150 is formed with a centrally disposed opening to be hereinafter referred to. The top piece 129 has a downwardly extending central boss 156 into which is threaded and locked a tube 157, said tube extending downward through the opening in the bottom of the member 150, and has attached to its lower end a piston 158. This piston fits tube 125 closely and has a circular plate valve 159 which covers ports in the piston not shown. The valve is held in proper location and guided by pins 160 and 161, which slide up and down through holes in piston 158, the pins having enlarged ends so that they limit the lift of valve 159. A plate valve 162 identical in construction with the valve 159 is provided to control ports in the bottom of member 150. Between valves 159 and 162 is a flat circular spring 162' designed to ensure the closing of valves 159 and 162 when they are close together. In the center of tube 125 is small tube 163 the lower end of which is threaded into boss 124, and the upper end of this tube projects into, and is concentric with tube 157 and there is a small clearance between the walls of these tubes. Both tubes 163 and 157 are perforated with small holes at regular intervals throughout their lengths. Concentric with tube 163 near its bottom is a plate 164, this plate being supported by a volute spring 165 seated in a recess provided in a boss 124. There is a reinforcing circular end piece 166 for tube 128, and 167 is a circular felt gasket to exclude dust. A felt gasket 168 compressed by a contracting metal ring 169 is for the purpose of wiping off any oil which may have passed the piston rings above, and 170 is a metal dust shield which is attached to flange 126. In the top piece 129 is an oil duct 171 fed by a flexible tube 171' for charging and replenishing the shock absorber with fluid, and 172 is an overflow hole or port to prevent the overcharging with said fluid.

Referring to Figure 9, the operation of the above described device is as follows. When the coil spring is compressed by a shock, the piston 158 moves downward in relation to tube 125, the valve 159 is forced up by the pressure of the oil, and some of the oil escapes from in front of the piston by passing through the ports in tube 163 and as the piston progresses downward the number of ports ahead of it become less, so that a progressive increase of resistance is obtained. If the shock is great enough to carry the piston down into contact with plate 164 the valve ports in the piston are covered, and the end of the cylinder becomes in effect a dash pot to cushion the last end of the stroke. On the return stroke of the piston upward, the valve in piston 158 is forced closed by the pressure of the oil, so that the resistance on the up stroke is greater than on the down stroke. Tube 157 to which the piston 158 is attached also has a series of holes at regular intervals along its length, through which oil escapes and flows back behind piston 158 when it is travelling upward. As tube 157 advances upward through the opening in the bottom of member 150, the number of holes or ports in tube 157 left below said opening grow less, so again there is a progressive resistance. When the piston begins its travel upwards the valve 162 is forced shut by the pressure of oil, and on the last part of the upward travel of the piston there being no escapement for the oil save leakage past the piston, an oil dash pot effect is produced to prevent shock when the piston brings the valves 159 and 162 into contact. When this occurs it is impossible for the coil spring to travel further upward, so that its rebound is absolutely limited. The recess in the cylindrical member 150 acts as an oil reservoir for the shock absorber chamber proper, and when the piston 158 moves downward, valve 162 is sucked open and the oil from the reservoir replenishes the space behind the piston, thus preventing the formation of any vacuum. If a series of rapid small movements of the piston should take place when it is at the top of the compression chamber, there is between the two valves 159 and 162 a circular flat spring 162' attached to one of the valves, whose office is to ensure that on these quick reversals of direction said valves are instantly closed. The constant movement of the parts will ensure proper lubrication by splash on the inside wall of tube 128 which telescopes with tube 125. Oil collecting ring 151 will wipe off the surplus oil and return it to the reservoir through ducts 152 and 153. Piston ring 154 serves somewhat the same purpose, and the final wiping process is performed by a felt gasket 168 which is held tightly against tube 125 by a contracting piston ring 169. Dust tube 170 insures the exclusion of dust and dirt from the oil coated surface of tube 125. The shock absorber is charged and replenished through tube 171 and its connecting duct in the top or head piece 129. Tube 171 can be lead to any convenient location on the frame or body, and an overflow port is provided at 172 to prevent overcharging. After the head piece 150 passes port 172 the air inside tube 128 is compressed, adding some resistance to the action of the shock absorber and increasing the speed of flow of oil past and behind the piston. It is noteworthy that there is no chance of leakage in this shock absorber and there are no glands under heavy pressure to leak. Because of the large area of the piston, comparatively large valve ports can be made use of. This aids materially in preventing the changes of temperature affecting the operation of the device.

In a chassis which makes use of independently sprung wheels as herein described, the conventional types of steering linkage usually employed with one piece axles will not work satisfactorily; therefore some type of divided linkage has to be employed. In Figures 10, 11, 12, 13, 14 and 15 is shown a novel type of steering linkage developed for the independently sprung wheel suspension as set forth in the instant application. Axle tube 49 and torque arm 72 are rigidly connected together and form in effect a V-shaped lever, and at their inner ends are pivotally connected to the lower part of the chassis frame by bolts 71 and 75, the common axis in both the vertical and horizontal planes of the pivotal connections being along the dotted line K. L. The outer end of the V-shaped lever 49, 72, is pivotally connected to the bottom of vertical member 52. Lever 68 is also V-shaped and is pivotally connected at its inner ends by bolts 175 and 176 to brackets 177 and 178 mounted on top of the chassis frame, the common axis in both the vertical and longitudinal planes of these pivotal connections being along the dotted line O. P. The outer end of lever 68 is pivotally connected to the top end of vertical member 52. The hinge axis K. L. of the lower V-shaped lever 49, 72 is parallel with the hinge axis O. P. of the upper V-shaped lever 68, and the pivotal connections at the top and bottom of vertical member 52 are parallel with the axes of O. P. and K. L. in the longitudinal and vertical planes. The vertical member 52 has rigidly secured to its outer side a plate 60 (Fig. 11) which has a boss adapted to receive the king pin 62, pivotally connecting thereto the forked end 65' of the usual type of stub axle 64 on which is mounted the road wheel 66. Rigidly secured to stub axle 64 is steering arm 179, provided with a ball headed stud 180 secured to 179 by nut 181.

The construction on the opposite side of the car is identical, and with particular reference thereto the axle tube 50 and torque arm 73 are rigidly connected together, and form in effect a V-shaped lever, and at their inner ends are pivotally connected to the lower part of the chassis frame by bolts 70 and 74, the common axis in both the vertical and horizontal planes of these pivotal connections being along the dotted line H. I. The outer end of the V-shaped lever 50, 73, is pivotally connected to the bottom of vertical member 51. Lever 67 which is also V-shaped, is pivotally connected at its inner ends by bolts 182 and 183 to brackets 184 and 185 mounted on top of the chassis frame, the common axis in both the vertical and horizontal planes of these pivotal connections being along the dotted line Q. R. The outer end of lever 67 is pivotally connected to the top end of vertical member 51. The hinge axis H. I. of the lower V-shaped lever 50, 73, is parallel with the hinge axis Q. R. of the upper V-shaped lever 67, and the pivotal connections at the top and bottom of vertical member 51 are parallel with the axes of H. I. and Q. R. in the longitudinal and vertical planes. The vertical member 51 has rigidly secured to its outer side a plate 59 (Fig. 11) which has a boss carrying the king pin 61 and pivotally connected thereto through a forked end 65', is the usual type of stub axle 63 on which is mounted the road wheel 65. Rigidly secured to stub axle 63 is steering arm 186, provided with a ball headed stud 187 secured to arm 186 by a nut 188.

Mounted transversely of the frame and close to cross member 92 is a square shaped guide bar of metal 189, (Figs. 10 and 11) whose ends are tapered off to form two ears provided with holes, by means of which with bolts and nuts 190, 190' and 191, 191', the guide bar 189 is rigidly secured to each of the lower flanges of the side rails 1, 1, of the frame. Slidably mounted on the guide bar 189 is a carriage 192 which has below it and integral therewith a horizontally arranged metal shelf 193. Carried by this shelf 193 are two ball headed studs 194 and 195 secured thereto by nuts 196 and 197 threaded onto the shanks of said studs, the balls on the ends of studs 194 and 195 projecting downwardly from the shelf 192 (Fig. 11). A tie rod 198 with suitable sockets on each end connects the ball stud 194 with the ball stud 180 on the end of steering arm 179, and a tie rod 199 with suitable sockets on each end connects the ball stud 195 with the ball stud 187 on the end of steering arm 186. A conventional type of steering gear 200 is bolted fast to the side rail 1 of the frame, a section of the steering column being shown at 201 and the gear is operated by the usual steering wheel not shown. The steering gear is constructed and mounted in such a manner as to swing a pitman arm 202 back and forth in a direction transverse the frame. Carried by the forward part of shelf 193 and secured thereto by nut 203 is a ball headed stud 204 with the ball projecting upward from shelf 193. A drag link 205 with suitable sockets on each end connects the ball stud 204 on the shelf 193 of carriage 192 with a ball formed integral with the end of the pitman arm 202.

It is now evident that when the steering wheel is turned and swings pitman arm 202, that carriage 192 will be moved by drag link 205 along the guide rod 189 and as the carriage is connected by tie rods 198 and 199 through steering arms 179 and 186 with wheels 65 and 66 the wheels will be swung in the same direction in unison on king pins 61 and 62.

In order to move carriage 192 along guide rod 189 with a minimum of friction ball bearings are employed. Figure 14 is an enlarged detail end view of carriage 192 and Figure 13 is an enlarged detail, partial sectional view taken on the line 13—13 of Figure 14. In Figure 14 it can be seen that the carriage 192 is formed of three parts 206, 207 and 208. The guide bar 189 has cut in its top and bottom sides V-shaped grooves 209 and 210. Directly above in part 206 and in line with groove 210 is a V-shaped groove 211, and directly below in part 208 and in line with groove 209 is a V-shaped groove 212. Grooves 210 and 211 act as a raceway or track for a set of steel ball bearings 213, while grooves 212 and 209 act as a raceway or track for a set of steel ball bearings 214. In order to retain all the steel balls in their relative positions, cages 215 and 216 are provided. These cages consist of flat metal plates the full size and shape of the section of the carriage 192 between which they are placed. The necessary holes are provided in these plates 215 and 216 at the desired location for each steel ball, and these holes are slightly larger than the steel balls. The three sections of the carriage 206, 207, and 208 are assembled with the plates 215 and 216 and the steel balls in place and are securely fastened together by four bolts 217, 218, 219 and 220, which pass down through all three sections 206, 207 and 208 and through cage plates 215 and 216, and have threaded to their bottom ends nuts 221, 222, 223 and 224 which hold all the parts in place. (Note 223 and 224 not shown in drawings.) If any adjustment is needed to tighten or loosen the ball bearings it can be secured by inserting or removing shims placed between the sections 206, 207 and 208. In order that the carriage 192 can move along guide rod 189 the grooves 209 and 210 cut therein must extend the full distance of the desired travel. With these ball bearings set at the proper tightness no undesirable forward or aft movement of the lower shelf 193 can take place.

Figure 15 is a view in elevation from the rear showing the carriage 192 and guide rod 189, and a sectional view of the covering to exclude dirt and retain lubricant. 225 and 226 are loose fabric covers kept away from the guide rod 189 by light coiled springs 227 and 228 placed inside the fabric covers. The closed coils at each end of these two coiled springs are sewed fast to the ends of the fabric covers and are snapped into grooves in the circular bosses 229, 230, 231 and 232. Two of these circular bosses 229 and 231 are fastened to guide rod 189, and the other two 230 and 232 are carried by the carriage 192.

As above stated, where composite axles are used, a special type of steering gear and linkage are necessary. To be successful it is essential that the arc of travel up and down of the ball 180 (Fig. 11) on the steering arm 179 be identical to the arc of travel of the tie rod socket attached thereto, otherwise the wheels will be pulled or shoved out of the desired line of travel and shimmy may result. In Figure 11 the pivotal axis of the tie rod 198 is in the exact center of the pivotal axis of the lower V lever formed by tubes 49 and 72 (Figure 10). This axis is shown by the broken line K. L., and the ball joint 180 is in the axial line of the pivotal joint at the outer ends of tubes 49 and 72 connecting these axle tubes with the vertical member 52; consequently on up and down movements of the wheel, the arc of travel of both the ball fast to steering arm 179 and its socket in tie rod 198, is the same along the arc (R. S.). The tie rod 199 and the other parts on the opposite side of the car are located in exactly the same relation to each other, so that the action is the same. Moving away from the normal straight ahead position of the wheels to the extreme lock, it will be found that 194 moves in a transverse direction to 194' and 180 moves in a transverse direction to 180'. The arc of travel of the socket on the outer end of the tie rod 198 is now along (E. F.), while the travel of the ball on arm 179 is along the arc (T. Z.). It can be seen that within the working range of the wheel travel up and down, the divergence even in this extreme position is negligible. When a car makes a turn, the turning angle of the wheel on the inside of the turn must be greater than the turning angle of the wheel on the outside of the curve, because the inside circle along which the inner wheel is moving is smaller than the circle described by the outside wheel. In Figure 10 it will be noted that this layout is ideal in this respect. Steering arm 186 swings the ball 187 on its outer end to point 187' a change of 50 degrees, while arm 179 has only swung ball 180 to 180' a change of 37 degrees. This difference in travel is correct for a car with 117 inch wheel base. The relative amount of turning between the two wheels can be made correct for any given wheel base by altering the fore and aft location of the balls 187 and 180 in relation to balls 195 and 194 and the angle and length of the steering arms 179 and 186. It is apparent, of course, that by turning the steering wheel, the pitman arm 202 actuated by the steering gear will move back and forth in a transverse direction and through the drag link 205, connecting it with the carriage 192, will move the latter back and forth on its guide rod, and as the carriage 192 is connected with the steering arms 179 and 186 by the two tie rods 198 and 199 it will move the wheels in unison with the carriage 192. It can be clearly seen in the drawings that the tie rods controlling the wheels are at an advantageous tangent to the arc of travel of the ends of the steering arms, therefore less power will be required to move the wheels. Any change of camber which takes place in the front wheels under rise and fall is always inward (Figure 6). Consequently the wheels cant in opposite directions and any gyroscopic forces which may be set up in each wheel will be cancelled by the same force acting in the opposite direction in the other wheel. This fact combined with the perfect geometry should eliminate any possibility of shimmy. Through the use of the ball bearings in the carriage and the balancing of the forces acting on the carriage through the location of the three ball headed studs carried by same, there will be very little friction and the steering will be correspondingly light.

The rate of flexibility of the spring suspension for motor cars is sharply limited in all conventional designs, because if it is too soft, it will strike through often, and will roll badly on turns. In the present application a design is presented to overcome this limitation by the use of a dual suspension, comprising a coil spring mounted in series with a laminated leaf spring. The coil having a very low rate gives an extremely soft ride, but its stroke is restricted by the amount of opening between its coils, and when this is taken up, the leaf spring takes all the remaining portion of the stroke, and being much stiffer than the coil spring, prevents frequent bottoming. Thus we secure a spring suspension suitable for either good or bad roads. Rolling is controlled by other factors described later herein. In addition to increased flexibility of the spring suspension overall, in the present case, means has been devised to greatly increase the flexibility under one wheel action, while at the same time increase the resistance to rolling.

Referring to Figure 4, let us for the purpose of illustration, assume that the rate of the coil spring 48 is 250 pounds per inch of deflection, and the rate of the leaf spring 37 is 350 lbs. per inch deflection, then each end A and B would be 175 lbs. per inch of deflection. The spring assembly is connected at the top to the frame by a ball joint 40 and at the bottom by ball and socket shackles 38 and 39. If the spring rate of the leaf spring 37 is 350 lbs. and that of the coil 48 is 250 lbs. then 350 plus 250 divided by 2 equals 300 lbs., which is the mean rate of the two springs. As these two springs are in series with each other, the amount of deflection of one has to be added to the amount of deflection of the other. To secure the actual rate of the combined springs you divide 300 by 2 and the result 150 lbs. per inch of deflection is the rate of the assembly overall. Under one wheel rise, if a force of 175 lbs. is applied to raise the end of the leaf spring 37 at 39, then portion A of the spring will be flexed one inch, and the assembly will swing on ball 40 and spring portion B will be also flexed one inch, and point 39 will rise 2 inches. The spring 37 in this case acts as a 2 to 1 lever against the coil spring 48 therefore the pressure to flex the coil spring 48 is 175×2 or 350 lbs. and 350 divided by 250 equals 1.4 inches that the bottom of the coil will be raised. If a rise of 1.4 inches takes place at the center of the spring lever 37, the end point 39 will rise 2×1.4 or 2.8 inches. Add this to the first stated rise of 2 inches and we have 2 plus 2.8 or 4.8 inches of total rise for point 39 under an applied force of 175 lbs., and the actual rate of the spring assembly under one wheel rise is 175 divided by 4.8 or 36.4 lbs. per inch of rise. Therefore we have at the rear end of the car an overall rate of 150 lbs. per inch of deflection and a resistance under one wheel rise of 36.4 lbs. per inch of wheel rise, or in other words the flexibility under one wheel action is four times as great as it is under two wheel rise. At the front end of the car we get the same effect.

As stated previously herein the leaf spring is connected to the frame of the chassis by telescoping tubes inside coil spring 48, the telescoping spring assembly being rigidly fixed to leaf spring 37 and connected at its top to the frame, by the ball joint 40. These telescoping tubes are rigid against any movement except that of telescoping on each other up or down, and the swinging and socket shackles 38 and 39 being set at a considerable angle to the vertical plane, any transverse movement of the leaf spring 37 would entail a flexing of the springs or raising the chassis frame. The assembly therefore gives a self-centering effect to the chassis frame. This same effect is secured at the front end of the car.

Referring to Figs. 1 and 2, as the ball and socket joints 40 and 87 on top of the rear and front end spring assemblies, carry a vast percentage of the load, it becomes evident that the rolling axis of the frame and body of the chassis would be the dotted line M. N. The vehicle being supported along its central axis M. N. on free ball and socket joints, it is clearly evident that the frame and body of the car will be relieved from heavy twisting stresses when passing over uneven road surfaces. From the above facts it must also be evident that the load on the wheels on one side of the vehicle is always approximately equal to the load on the wheels on the opposite side. This equalization will ensure better traction, and prevent tramping so called. Referring to Figure 2, it will be noted that the axis line M. N. of the spring suspension support of the chassis frame and body is high up, and is designed to pass through the center of gravity of the sprung mass. Consequently when suddenly changing the line of travel or rounding curves, there are no moments about axis M. N. to cause roll from the effect of centrifugal force. This important advantage is shown graphically in diagram Fig. 16. Here the center of gravity of the masses A and B is at the rolling axis, consequently the mass above the rolling axis is equal to the mass below the rolling axis and the centrifugal force acting on the mass above the rolling axis is cancelled by the same force acting on the mass below the rolling axis.

By far the greatest force acting to induce rolling of the chassis of a car on the spring suspension is centrifugal force and already herein it has been shown how this force has been cancelled. There remains to be taken care of, impulses imparted to the frame under one wheel action, out of balance loading and other causes due to some peculiar combination of road, speed etc.

In order to prevent rolling from any cause, two torsional stabilizers 94 and 95 are made use of, one near each end of the vehicle. (Figs. 1, 2, 3 and 4.) This device which is in common use has one great advantage in that it does not offer any resistance if both road wheels of a pair rise an equal distance at the same time, or the frame falls level toward the road. The only result under either of these actions is that the torsion rods are oscillated in the free bearings on each of their ends, but if one side of the frame rolls down and the other side up, one of the lever arms 96 and 97 is being shoved up and the other pulled down, and this action is resisted by the resistance of the spring steel rod to torsion. Unfortunately the same conditions exist under one wheel rise that pertains under rolling, and the torsional stabilizers greatly stiffen the resistance to one wheel action, when connected direct to a one piece axle as in common practice.

In the present design a way has been found to get around this difficulty. Figure 5 is a diagram used to illustrate this point. Let it be assumed that the resistance of the spring steel torsion rod (G) to movement at the end (F) of the lever arm fixed to it, is 200 lbs. per inch of travel either up or down. If the wheel at point (A) rises one inch then the half way point (C) on lever arm (A. B.) rises one half inch. If point (C) rises ½ inch then the half way point (E) on lever C. D. rises ¼ inch, and the resistance to this one wheel rise is ¼ of 200 result fifty pounds resistance from the torsion bar per inch of wheel rise. This resistance of 50 lbs. is reduced at the wheel through the compound levers to 12½ lbs. If the frame rolls down and carries point B and G with it one inch, then point (C) falls ½ inch and point (E and F) falls ¼ inch. If G. has fallen one inch and F only a quarter inch we still have ¾ inch of travel at point (F), thus ¾ of 200 is 150 lbs. resistance against one inch of roll. We get under roll the same amount of movement on the opposite end of the torsion rod, only it is pull instead of push, therefore the total resistance of the torsion rod to rolling of the frame is 2×150 result 300 lbs. resistance to each inch of roll. Under roll the inner end of the transverse lever does not rise or fall to any appreciable extent, because it is almost directly under the rolling axis M. N. in Figs. 1 and 2. The net result of this novel hook up of the torsional stabilizer is, a resistance to one wheel rise of only 12½ lbs. per inch, while the resistance to rolling is 300 pounds per inch of roll. At the front end of the car conditions are somewhat different, and therefore a different method is employed. In Figure 1, it can be seen that the ball joint at the bottom of link 108 by which it is connected to the axle tube 49 is less than half way between the hinge axis K. L. and the center of wheel 66. On the opposite side of the frame the same condition exists. Let it be assumed that the resistance of the spring steel torsion rod 95 is 100 lbs. per inch of travel of the outer ends of levers 98 and 99. Then if wheel 66 rises one inch the end of lever 98 will be raised ½ inch and the resulting resistance is 100 divided by 2, or 50 pounds resistance from the torsion rod per inch of wheel rise. The resistance to rise at the wheel is reduced by leverage to 25 lbs. If the frame rolls down on one side one inch, the outer end of the arm fixed to the torsion rod on that side of the frame will be raised one inch, and the resistance will be 1×100 result 100 lbs. per inch. Under roll, as the opposite side of the frame rises the same amount, we would get a pull down of one inch at the outer end of the rod fixed to the torsion rod on that side of the frame, so the total resistance to roll from the front torsional rod would be 2×100 or 200 lbs. per inch of roll. With this hook up for this device the following effects will be noted, no resistance under two wheel rise, therefore it does not change the spring rate of the car, 25 lbs., resistance to each inch of one wheel rise, at the front and 12½ lbs. at the rear and a total of 500 lbs. resistance to each inch of rolling of the frame.

As the car cannot roll there will be no tendency to lift the wheels on the inside when rounding curves, consequently the car will have better traction and will be safer to drive. Because of the fact that the resistance to one wheel rise is only one fourth the rate of the suspension springs, and the thrust of the stabilizer against the frame is only 50 lbs. to the inch of wheel rise, and we have a resistance of 500 lbs. to the inch against rolling, no rolling impulse of sufficient force to induce roll can be picked up from the road. This eliminates the most unpleasant and dangerous movement that a car can have.

In the present design the wheel rise at the rear end of the car is absolutely at right angles to the center line of the frame at all times, and the track width or tread is a constant distance. The vertical rise of the wheels permits the use of a considerably longer rear seat than is the case where the camber of the wheels change, as in transverse swinging axles or the conventional one piece axle. It will be noted that the employment of two arms 2, 3, and 4, 5, to hold each wheel in place gives a very powerful construction with a minimum of weight, and there is no possibility of out of line wheel travel. The arms 2 and 3 take the drive of the car in a direction almost in line with their longitudinal axis which reduces the strain to a minimum. These arms also take the driving torque and braking torque. The arms 4 and 5 through their outer forked ends have a substantial hold on the wheels to maintain them in a vertical position, and have a sufficient transverse location to make a rigid brace to prevent any change of track width. The bearings which carry the two transverse shafts 25 and 26, which act as a hinge for the arms 2 and 3 and for arms 4 and 5, are spaced well apart so that the possibility of movement of the wheels in a transverse direction is eliminated and the strains on the parts are reduced to a minimum. This construction is both novel and practical.

At the front end of the car the parallel linkage provided to link the wheels with the frame, has a short upper link and a long bottom link. This results in maintaining a constant tread width and a relatively small change in the camber of the wheel under up and down movement. Figure 6 is a diagram illustrating this point. It will here be noted that the bottom of the tire follows a straight line in the vertical plane, when it is either raised or lowered from the normal, while the top of the wheel and tire moves slightly inward on both the up and down movement of the wheel. This maintaining of the tread width is important in steering and controlling the car and greatly reduces tire wear. Minimizing the change of camber of the wheels and having any such change take place in opposite direction for each wheel will prevent the setting up of shimmy due to gyroscopic forces.

In the present invention it is preferable to use rubber or like insulation at every point of contact between the running gear and frame, and the design lends itself to this desirable end, which will eliminate destructive high frequency vibration and greatly reduce shocks. Where the front and rear running gear is attached to the frame, large area cushioned bushings are employed. Where the spring suspension at both the front and rear end of the car connects to the frame, large area rubber pads or the like are interposed, and there is no metal to metal contact. The differential case where it attaches to the frame, is also insulated with two cushioned bushings. By employing a comparatively large area of rubber or similar material at all these points, the weight per square inch of bearing surface is low, and the rubber or like material has enough resiliency left to readily fulfill its purpose. The design is such that in spite of the rubber softness no side movement is permitted at any of these points.

In Figs. 1 and 2 it is clearly shown that the spring assembly at both the front and rear end of the car are placed at a considerable angle (preferably 30 degrees) to the vertical plane. Referring to the rear spring assembly for example, it is hung at the top on ball and socket joint 40 and at the bottom on ball and socket jointed shackles 38 and 39. The spring assembly therefore is capable of tilting in a fore and aft direction. These shackles 38 and 39 are not in the same vertical plane as ball joint 40 but are several inches farther forward, consequently when the wheels 6 and 7 rise, the angle of a line drawn through the center of ball joints on 39 and 40 with the vertical plane would increase as 38 and 39 continue to rise. In the present case the increase in angle, when the wheels rise to the top of their stroke amounts to about 15 degrees.

Figure 17:
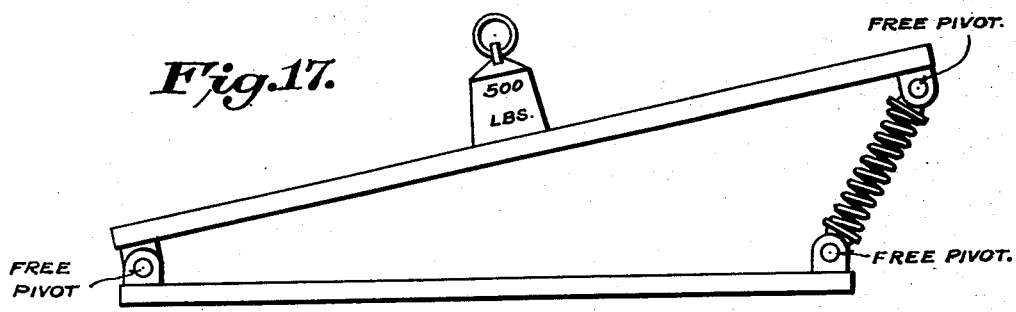
Figure 18:
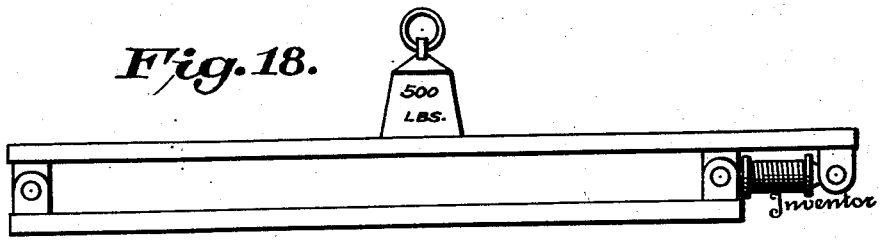

Figures 17 and 18 are simple diagrams to illustrate what this change of angle means. Figure 17 shows a base to which is pivotally connected at one end, a beam carrying a weight. The other end of the beam is supported by a coil spring interposed between it and the base. The spring is placed at a considerable angle to the transverse vertical plane. If the beam is depressed to the position shown in Figure 18 with the spring horizontal, it is evident that the spring cannot raise the weight, because the force stored in the spring no longer has any vertical component. From this by a simple process of deduction it can be seen that the greater the angle, the less the vertical component of the force stored in the spring, and consequently the slower the return of the weight to its original position. From elementary mechanics, the resolution of forces we get what is represented graphically in Figure 19. Here a force is acting in a direction O. A. which force can be resolved into two equal forces acting along lines O. B. and O. C. at right angles to each other. If the angle A. O. C. is decreased the horizontal component of the force O. C. is increased and the vertical component of the force O. B. is decreased. The proportion of changing weight and period of oscillation due to changing angle of the support springs, is shown graphically in Figure 20. A. B. is the unit of time for the reaction of the spring and 1400 pounds is the load. If the spring is placed so that the line of force acting through it against the load is at an angle of 31 degrees to the vertical plane, 222 lbs. are added artificially to the load and the unit of time for the reaction of the spring is increased by B. C. When under stroke, the angle of the line of force acting through the springs is increased to 45 degrees to the vertical plane. Then 566 lbs. artificial load is added and the time for the return of the spring to normal position is increased by B. D. resulting in a very substantial slowing down of the return movement, which in practice means reduced overbounding, afterbounding and pitching.

A coil spring not having any exterior friction is more sensitive and easier started into motion than a leaf spring of the same rate. In the present invention the travel or stroke of the coil spring is restricted within certain limits, on the compression stroke by the coils closing on each other, and it cannot rebound past the normal because it is stopped by the limit set for travel of the piston in the shock absorber inside the coil spring. The coil spring being in series with the semi-elliptic leaf spring, no unpleasant shocks will result from these restrictions of travel of the coil spring, but the amplitude of travel up and down of the car body will be reduced. The rates of flexibility of the coil and leaf spring differ very greatly, the coil being much the softer, consequently they have entirely different periods of oscillation, and as a result it would be impossible to have both springs synchronize with the road undulations at the same time. If the springs of a car get into synchronization with the road undulations the result is unpleasant and dangerous, so that this feature of the invention is important. The coil being the softer of the two springs will take the largest proportion of the flexure during the first part of the wheel rise, while the leaf spring which is much stiffer will take most of the flexure on the last part of the wheel rise. As the angle of the spring changes more rapidly on the last part of the wheel rise, it will effectively prevent overbounding caused by the leaf spring. The speed of the coil spring is checked some by the increased angle, but mostly by the hydraulic shock absorber built in combination with its mounting. No additional shock absorbers will be required, and the free powerful leaf spring will keep the wheels down against the road surface at all times, without interference from a shock absorber, as is the case in conventional practice.

Another distinct advantage of this design is that it permits of a very low hung chassis and body. Only half the amount of clearance between the axles and frame is required as compared to conventional designs. In Fig. 4 the point where the side rails of the frame are over the live axles 8 and 9 is about half way between the universal joints at the ends of each of these axles, and if the wheels carry the outer joints up six inches, the center point on the axles would only rise 3 inches. As the differential rises and falls with the frame instead of in relation to it, it is possible to place the seat cushion directly on top of it. Further there is considerable less unsprung weight in this design, as the main body of the springs and the differential are not carried on the axles.

The suspension springs have no other function to perform except to support the load and cushion shocks. They are not subjected to torsion, so their action will be smoother. The position of the wheels in relation to the center line of the frame is controlled positively, and they cannot shift momentarily out of line as is possible where the axle is controlled by springs. The annoying phenomena of shimmy and nose shake will be found missing when this type of suspension is employed.

Various detail changes and substitution can be made in the assembly, and still secure good results, and it is equally practical to use one coil spring or a number of them in series with the transverse leaf spring. If the loads were very heavy it might be desirable to have a multiple of spring assembly units. If desired conventional hydraulic shock absorbers with the usual type and place of mounting could be used.

What I claim is:

1. In a vehicle suspension, the combination with a frame, of a running gear including front and rear divided axles, pivotal connections between said axles and frame, front and rear transverse springs, pivotal connections between said springs and frame and between said springs and axles, a torsion rod pivotally mounted transversely of the frame adjacent each divided axle and a pair of arms rigid with respect to each torsion rod connecting said torsion rods and running gear.

2. In a vehicle suspension, the combination with a frame, of a running gear including front and rear divided axles, pivotal connections between said axles and frame, front and rear transverse springs, pivotal connections between said springs and frame and between said springs and axles, a torsion rod pivotally mounted transversely of the frame adjacent each divided axle and a pair of arms rigid with respect to each torsion rod connecting said torsion rods and their respective axles.

3. In a vehicle suspension, the combination with a frame, of a running gear including front and rear divided axles, pivotal connections between said axles and frame, front and rear transverse springs, pivotal connections between said springs and frame and between said springs and axles, a torsion rod pivotally mounted transversely of the frame adjacent each divided axle and lever arms rigidly connected to the outer ends of the torsion rods and pivotally connected by intermediate levers to the running gear.

4. In a vehicle suspension, the combination with a frame, of a running gear including front and rear divided axles, pivotal connections between said axles and frame, front and rear transverse springs, pivotal connections between said springs and frame and between said springs and axles, torque arms for said front and rear axles rigidly connected to said axles and pivotally connected to the frame, a torsion rod rotatably mounted transversely of the frame adjacent each divided axle, arms rigidly connected to the outer end of the front torsion rod and pivotally connected to the front divided axle and arms rigidly connected to the outer ends of the rear torsion rod and pivotally connected to the torque arms of said rear axles.

5. In a vehicle suspension, the combination with a frame, of a running gear including front and rear divided axles, pivotal connections between said axles and frame, front and rear transverse springs, pivotal connections between said springs and frame and between said springs and axles, a pair of torque arms having their forward ends rigidly connected to a respective section of the front divided axle and pivotally connected at their rear ends to the frame, torque arms for the rear axles comprising an inner pair and an outer pair, all of said torque arms being pivotally mounted at their forward ends transversely of the frame, the rear ends of said torque arms being rigidly connected to the rear axle assembly, a torsion rod rotatably mounted transversely of the frame adjacent each divided axle, lever arms rigidly connected to the outer ends of the front torsion rod and pivotally connected to the front divided axle and arms rigidly connected to the outer ends of the rear torsion rod and pivotally connected to torque arms of said rear axles.

6. In a vehicle suspension, the combination with a frame, of a running gear including front and rear divided axles, pivotal connections between said axles and frame, front and rear transverse springs, pivotal connections between said springs and frame and between said springs and axles, each section of the front divided axle being provided with a torque arm rigidly connected thereto intermediate the inner and outer ends thereof, said torque arms having their rear ends pivoted to the frame, stub axles for said divided front axle, a vertical member secured to each stub axle, a pivotal connection between the lower end of each vertical member and the outer end of its adjacent divided axle section, a pair of V-shaped links adapted to cooperate with the divided front axle assembly, pivotal connections between the free ends of said links and the frame and pivotal connections between the outer ends of said links and the upper ends of the said vertical member.

7. In a vehicle suspension, the combination with a frame, of a running gear including front and rear divided axles, pivotal connections between said axles and frame, front and rear transverse springs, pivotal connections between said springs and frame and between said springs and axles, each section of the front divided axle being provided with a torque arm rigidly connected thereto intermediate the inner and outer ends thereof, said torque arms having their rear ends pivoted to the frame, stub axles for said divided front axle, a vertical member secured to each stub axle, a pivotal connection between the lower end of each vertical member and the outer end of its adjacent divided axle section, a pair of V-shaped links adapted to cooperate with the divided front axle assembly, pivotal connections between the free ends of said links and the frame and pivotal connections between the outer ends of said links and the upper ends of the said vertical member, the longitudinal axes of the pivots connecting the inner ends of the divided front axle and the inner ends of each of their respective torque arms being in line, and parallel to the longitudinal axes of the pivots for the free inner ends of their respective cooperating V-shaped links.

8. In a vehicle suspension, the combination with a frame, of a running gear including front and rear divided axles, pivotal connections between said axles and frame, front and rear transverse springs, pivotal connections between said springs and frame and between said springs and axles, each section of the front divided axle being provided with a torque arm rigidly connected thereto intermediate the inner and outer ends thereof, said torque arms having their rear ends pivoted to the frame, stub axles for said divided front axle, a vertical member secured to each stub axle, a pivotal connection between the lower end of each vertical member and the outer end of its adjacent divided axle section, a pair of V-shaped links adapted to cooperate with the divided front axle assembly, pivotal connections between the free ends of said links and the frame and pivotal connections between the outer ends of said links and the upper ends of the said vertical member, the longitudinal axes of the pivots connecting the inner ends of the divided front axle and the inner ends of each of their respective torque arms being in line and parallel to the longitudinal axes of the pivots for the free inner ends of their respective cooperating V-shaped links, and a divided steering mechanism for said front axle assembly.

9. In a vehicle suspension, the combination with a frame, of a running gear including front and rear divided axles, pivotal connections between said axles and frame, front and rear transverse springs, pivotal connections between said springs and frame and between said springs and axles, a pair of torque arms having their forward ends rigidly connected to a respective section of the front divided axle and pivotally connected at their rear ends to the frame, stub axles for said divided front axle, a vertical member secured to each stub axle, a pivotal connection between the lower end of each vertical member and the outer end of its adjacent divided axle section, a pair of V-shaped links adapted to cooperate with the divided front axle assembly, pivotal connections between the free ends of said links and the frame and pivotal connections between the outer ends of said links and the upper ends of the said vertical member.

10. In a vehicle suspension, the combination with a frame, of a running gear including front and rear divided axles, pivotal connections between said axles and frame, front and rear transverse springs, pivotal connections between said springs and frame and between said springs and axles, a pair of torque arms having their forward ends rigidly connected to a respective section of the front divided axle and pivotally connected at their rear ends to the frame, stub axles for said divided front axle, a vertical member secured to each stub axle, a pivotal connection between the lower end of each vertical member and the outer end of its adjacent divided axle section, a pair of V-shaped links adapted to cooperate with the divided front axle assembly, pivotal connections between the free inner ends of said links and the frame and pivotal connections between the outer ends of said links and the upper ends of the said vertical member, the longitudinal axes of the pivots connecting the inner ends of the divided front axle and the inner ends of each of their respective torque arms being in line, and parallel to the longitudinal axes of the pivots for the free ends of their respective cooperating V-shaped links.

11. In a vehicle suspension, the combination with a frame, of a running gear including front and rear divided axles, pivotal connections between said axles and frame, front and rear transverse springs, pivotal connections between the transverse springs and axles, a coil spring member rigidly secured to the intermediate portion of each transverse spring, a pivotal connection between the upper end of the coil spring member and frame, a torsion rod pivotally mounted transversely of the frame adjacent each divided axle, and lever connection between the said torsion rods and running gear.

12. In a vehicle suspension, the combination with a frame, of a running gear including front and rear divided axles, pivotal connections between said axles and frame, front and rear transverse springs, pivotal connections between the transverse springs and axles, a coil spring member rigidly secured to the intermediate portion of each transverse spring, a pivotal connection between the upper end of the coil spring member and frame, a torsion rod pivotally mounted transversely of the frame adjacent said divided axle and lever connection between the said torsion rods and running gear, said springs being mounted on an angle to the vertical.

13. In a vehicle suspension, the combination with a frame, of a running gear including front and rear divided axles, pivotal connections between said axles and frame, front and rear transverse springs, pivotal connections between the transverse springs and axles, a coil spring member rigidly secured to the intermediate portion of each transverse spring, a pivotal connection between the upper end of the coil spring member and frame, a pair of torque arms having their forward ends rigidly connected to a respective section of the front divided axle and pivotally connected at their rear ends to the frame, torque arms for the rear axles comprising an inner pair and an outer pair, all of said torque arms being pivotally mounted at their forward ends transversely of the frame, the rear ends of said torque arms being rigidly connected to the rear axle assembly, a torsion rod rotatably mounted transversely of the frame adjacent each divided axle, lever arms rigidly connected to the outer ends of the front torsion rod and pivotally connected to the front divided axle and arms rigidly connected to the outer ends of the rear torsion rod and pivotally connected to torque arms of said rear axles and a divided steering mechanism for said spring suspension.

14. In a vehicle suspension, the combination with a frame, of a running gear including front and rear divided axles, pivotal connections between said axles and frame, front and rear transverse springs, pivotal connections between the transverse springs and axles, a coil spring member rigidly secured to the intermediate portion of each transverse spring, a fluid pressure retarding device associated with each coil spring member, a pivotal connection between the upper end of the coil spring member and frame, a pair of torque arms having their forward ends rigidly connected to a respective section of the front divided axle and pivotally connected at their rear ends to the frame, torque arms for the rear axles comprising an inner pair and an outer pair, all of said torque arms being pivotally mounted at their forward ends transversely of the frame, the rear ends of said torque arms being rigidly connected to the rear axle assembly, a torsion rod rotatably mounted transversely of the frame adjacent each divided axle, lever arms rigidly connected to the outer ends of the front torsion rod and pivotally connected to the front divided axle and arms rigidly connected to the outer ends of the rear torsion rod and pivotally connected to torque arms of said rear axles and a divided steering mechanism for said spring suspension.

15. In a vehicle suspension, the combination with a frame and running gear, of a front and rear spring assembly including a spring member comprising a coil spring, a base plate and cap piece for said coil spring, a cylindrical member carried by the base plate within the coil spring and extending upwardly, a cylindrical member carried by the cap piece within the coil spring, extending downwardly, said cylindrical members adapted to telescope one within the other and to contain a fluid, and restricted means for passing the fluid back and forth from one cylindrical member to the other to retard the telescoping movement of said members.

16. In a vehicle suspension, the combination with a frame and running gear, of a front and rear spring assembly, each including a leaf spring and a coil spring member, said coil spring member comprising a coil spring, a base plate for rigidly securing said coil spring member to the leaf spring, a cap piece for pivotally securing the coil spring member to the vehicle frame, telescoping cylindrical members carried by the base plate and cap piece within the coil spring, said telescoping members adapted to contain a fluid, restricted means for automatically passing the fluid back and forth from one cylindrical member to the other to retard the action of the coil spring and its associated spring suspension.

17. In a vehicle suspension, the combination with a frame, of a running gear including front and rear divided axles, said axles having pivotal connections arranged so as to maintain a constant tread width under rise and fall of the road wheels, front and rear transverse springs, flexible connections between said springs and frame, and between said springs and axles and means to control rolling of said frame on the running gear.

18. In a vehicle suspension, wheel spindles carrying road wheels, arms suitably connected to said spindles and suitably connected at their inner ends to the vehicle frame or body in a manner to permit vertical rise or fall of said wheels without a loss of alignment, front and rear transverse spring elements, said springs connected to the arms and connected to the frame or body in a manner to permit universal movement and means to limit or control rolling of said body on the running gear.

STEPHEN LEONARD CHAUNCEY COLEMAN.